US011339256B1

(12) United States Patent
Liu et al.

(10) Patent No.: US 11,339,256 B1
(45) Date of Patent: May 24, 2022

(54) DUAL CURE COMPOSITION

(71) Applicant: Dow Silicones Corporation, Midland, MI (US)

(72) Inventors: Junying Liu, Auburn, MI (US); David M. Altergott, Bay City, MI (US); Steven Swier, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 17/605,015

(22) PCT Filed: Aug. 3, 2020

(86) PCT No.: PCT/US2020/044708
§ 371 (c)(1),
(2) Date: Oct. 20, 2021

(87) PCT Pub. No.: WO2021/026054
PCT Pub. Date: Feb. 11, 2021

Related U.S. Application Data

(60) Provisional application No. 62/883,141, filed on Aug. 6, 2019.

(51) Int. Cl.

| | | |
|---|---|---|
| *C08G 77/18* | (2006.01) | |
| *C08J 3/24* | (2006.01) | |
| *C08L 83/04* | (2006.01) | |
| *C08K 5/37* | (2006.01) | |
| *C08K 5/5419* | (2006.01) | |
| *C08G 77/20* | (2006.01) | |
| *C08G 77/00* | (2006.01) | |
| *C08G 77/08* | (2006.01) | |

(52) U.S. Cl.
CPC .............. *C08J 3/243* (2013.01); *C08G 77/08* (2013.01); *C08G 77/18* (2013.01); *C08G 77/20* (2013.01); *C08G 77/80* (2013.01); *C08K 5/37* (2013.01); *C08K 5/5419* (2013.01); *C08L 83/04* (2013.01); *C08G 2150/00* (2013.01); *C08G 2170/00* (2013.01)

(58) Field of Classification Search
CPC ........ C08G 77/20; C08G 77/80; C08G 77/18; C08L 71/00; C07C 321/02; C07C 323/22
See application file for complete search history.

(56) References Cited

U.S. PATENT DOCUMENTS

| | | |
|---|---|---|
| 4,699,802 A | 10/1987 | Nakos et al. |
| 5,188,864 A * | 2/1993 | Lee .................. C08L 83/04 522/12 |
| 5,516,812 A | 5/1996 | Chu et al. |
| 5,753,720 A | 5/1998 | Nakanishi et al. |
| 6,451,870 B1 | 9/2002 | DeCato et al. |

FOREIGN PATENT DOCUMENTS

| | | |
|---|---|---|
| CN | 103992650 | 8/2014 |
| EP | 0492830 | 7/1992 |
| EP | 1231241 | 8/2002 |
| WO | 2019005393 | 1/2019 |
| WO | 2019099347 | 5/2019 |

OTHER PUBLICATIONS

Smith, A. Lee, ed., The Analytical Chemistry of Silicones, John Wiley & Sons: NY, 1991, p. 347-349, 371-378, 379-381.

Xue, et al,, Preparation and characterization of novel UV-curing silicone rubber via thiol-ene reaction, Materials Letters 106 (2013) pp. 425-427.

Cramer, et al., Photopolymerizations of Thiol-Ene Polymers without Photoinitiators, Macromolecules, 2002, 35, pp. 5361-5365.

\* cited by examiner

*Primary Examiner* — Kuo Liang Peng
(74) *Attorney, Agent, or Firm* — Steven W. Mork

(57) ABSTRACT

A composition contains (a) a silicon-free mercapto compound comprising 2 or more mercapto groups; (b) a linear polyorganosiloxane containing one or more than one terminally unsaturated alkenyl group, 40 mole-percent or more phenyl groups relative to moles of silicon atoms and at least one alkoxysilyl group per molecule; (c) a resinous polyorganosiloxane containing one or more than one terminally unsaturated alkenyl group and 20 mole-percent or more phenyl groups relative to moles of silicon atoms; (d) a photoinitiator; and (e) a moisture cure catalyst; and wherein the molar ratio of mercapto groups to terminally unsaturated alkenyl groups in the composition is in a range of 0.3 to 2.0.

9 Claims, No Drawings

DUAL CURE COMPOSITION

BACKGROUND OF THE INVENTION

Field of the Invention

The present invention relates to a composition containing a silicon-free mercapto compound having two or more thiol functionalities, a linear polyorganosiloxane containing a terminally unsaturated alkenyl group, an alkoxysilyl group and phenyl groups and a resinous polyorganosiloxane containing a terminally unsaturated alkenyl group and phenyl groups.

Introduction

Light and moisture dual cure compositions are useful, for example, in coating, encapsulation, potting and adhesive applications where exposure of all portions of a coating to light is difficult yet rapid curing of the coating is desirable. The moisture cure mechanism serves to cure composition blocked from exposure to light ("shadow areas"). Dual cure mechanisms are valuable in coatings to enable moisture curing to complete curing when light cannot access all areas of a coating.

Dual cure compositions can comprise (meth)acrylate-based curing systems. However, (meth)acrylate-based systems are sensitive to and inhibited by oxygen so inert conditions are necessary during curing, at least the composition surface. Providing the necessary inert atmosphere adds undesirable expense and complexity to a curing process.

For elastomer and silicone rubber applications, dual cure compositions can include thiol-ene reactive components (thiol-ene systems) that participate in light initiated curing instead of (meth)acrylate-based curing systems. Thiol-ene systems contain thiol-containing reactants and carbon-carbon double bond unsaturated reactants. Upon exposure to light the thiol functionality reacts with and adds across the double bond of the unsaturated reactant. Dual cure systems utilizing thiol-ene chemistry typically contain thiol-containing siloxane and unsaturated siloxane reactants. Thiol-ene reactants have been limited in application to elastomer and silicone rubber applications presumably because the miscibility of the thiol-ene reactive components is insufficient to achieve high enough crosslink density for hard and scratch resistant cured compositions. When enough crosslinking functionalities are present to achieve a hard cured composition, the composition is inhomogeneous, which results in poor scratch-resistance. It is valuable to form cured compositions that are both hard and scratch-resistant to avoid developing defects in the cured composition as it contacts other objects during and after processing.

It would advance the art to identify a thiol-ene based dual cure composition that produces a cured silicone composition that is both hard (Shore A hardness of at least 50, preferably at least 60) and that is scratch-resistant (Pencil Scratch Resistance of at least 4B).

BRIEF SUMMARY OF THE INVENTION

The present invention provides a thiol-ene based dual cure composition that produces a cured silicone composition that is both hard (Shore A hardness of at least 50, preferably at least 60) and that is scratch-resistant (Pencil Scratch Resistance of at least 4B).

The present invention is a result of discovering how to make thiol components and alkene components more compatible so they can be present at high enough concentrations to produce coatings with the specified hardness and be compatible enough to obtain scratch-resistant coatings. Siloxane thiols and siloxane alkenes are typically insufficiently compatible to make compositions that are both hard and scratch-resistant. However, it has now been discovered as part of this invention that silicon-free thiol containing components are sufficiently miscible with phenyl-containing polyorganosiloxane having one or more terminally unsaturated alkenyl group and one or more alkoxysilyl group (especially one or more di- and/or trialkoxysilyl group) so as to form a composition that can dual cure into a coating that is hard and scratch-resistant.

Moreover, the present invention has discovered that compositions containing a combination of silicon-free dimercapto materials and silicone-free mercapto materials having three or more mercapto groups can have a low viscosity for ease of processing and cure to cured compositions having particularly high hardness and/or scratch-resistance.

Still more, the present invention is further a result a discovering that alkoxy silanes can be included as reactive diluents that lower composition viscosity, while increasing one or more than one of clarity, hardness and/or scratch-resistance of a cured composition made from the composition.

In a first aspect, the present invention is a composition comprising: (a) a silicon-free mercapto compound comprising 2 or more, preferably 3 or more mercapto groups; (b) a linear polyorganosiloxane having one or more than one terminally unsaturated alkenyl group, 40 mole-percent or more phenyl groups relative to moles of silicon atoms and at least one alkoxysilyl group per molecule; (c) a resinous polyorganosiloxane containing one or more than one terminally unsaturated alkenyl group and 20 mole-percent or more phenyl groups relative to moles of silicon atoms; (d) a photoinitiator; and (e) a moisture cure catalyst; and wherein the molar ratio of mercapto groups to terminally unsaturated alkenyl groups in the composition is in a range of 0.3 to 2.0.

The composition of the present invention is useful for making hard and scratch resistant cured composition for use as, for example, coatings and encapsulating materials.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International; EN refers to European Norm; DIN refers to Deutsches Institut für Normung; and ISO refers to International Organization for Standards.

"Multiple" means two or more. "And/or" means "and, or as an alternative". All ranges include endpoints unless otherwise indicated. Products identified by their tradename refer to the compositions available from the suppliers under those tradenames at the priority date of this document unless otherwise stated herein.

"Light", in its broadest scope as used herein, refers to electromagnetic radiation. Preferably, light as used herein refers to visible and/or ultraviolet (UV) light.

"Organic compound" a chemical compound that contains carbon.

"Polyorganosiloxane" is a compound that contains multiple siloxane units ("polysiloxane"), at least one of which has an organic group bonded to at least one silicon atom. Polysiloxanes comprise multiple siloxane linkages (Si—O—Si) and are typically characterized by what siloxane units make up the siloxane linkages. Siloxane units can be selected from a group consisting of M-type, D-type, T-type and Q units. By convention M units have the formula $(CH_3)_3SiO_{1/2}$, D units have the formula $(CH_3)_2SiO_{2/2}$, T units have the formula $(CH_3)SiO_{3/2}$ and Q units have the formula $SiO_{4/2}$. M-type, D-type and T-type units refer to conventional units that may have one or more methyl group replaced with hydrogen, or some other moiety and are often identified by the siloxane unit letter designation with a suprascript identifying the moiety replacing a methyl group. For example, $D^{Ph}$ refers to a D unit where one of the methyl groups has been replaced with a phenyl group and $D^{PhPh}$ refers to a D unit where each of the two methyl groups have been replace with a phenyl group. Herein, subscripts used in resinous polyorganosiloxane formulas indicate the average mole-percent of the associated siloxane unit relative to all siloxane units in the molecule, while subscripts used in linear polyorganosiloxane formulas indicate the average absolute number of the associated siloxane unit in the molecule.

"Mercapto" group is a group that contains a sulfur-hydrogen bond (—SH). Thiol groups are an example of a mercapto group where an organic group (R) is attached to the mercapto group (R—SH).

"Acrylic compounds". Materials containing a (meth)acrylate group. "(meth)acrylate" refers to methacrylate, acrylate and combinations thereof.

"Alkylene" is a bivalent saturated aliphatic radical. Alkylenes can be formed by opening a carbon-carbon double bond or removal of two hydrogen atoms from different carbon atoms.

"Terminally unsaturated alkenyl group" refers to an alkenyl group that has a carbon-carbon double bond between a terminal carbon and an adjacent carbon at the end of a carbon chain remote from where the hydrogen atom would have been removed to form the alkenyl group from a corresponding alkene group. For example, allyl groups are terminally unsaturated alkenyl groups. For avoidance of doubt, vinyl groups are also considered terminally unsaturated alkenyl groups.

An expression of the form "$C_{x-y}$" where x and y are numbers refers to a component have from x to y carbon atoms.

Room temperature ("R.T.") is 25 degrees Celsius (° C.).

Characterize viscosity of materials at 25° C. using a Brookfield DV1 viscometer using a CPA-42Z cone spindle.

Characterize the hardness of a cured composition in terms of Shore A hardness. Cure 800 micron thick films by irradiating with two Joules per square centimeters (J/cm$^2$) of UVA+UVB radiation followed by allowing to set at 23 degrees Celsius (° C.) for 7 days. Layer films together to get a 6.5 millimeter (mm) thick stack and use that stack to measure Shore A hardness. Determine Shore A hardness for the stack according to ASTM D2240.

Characterize tensile strength of a cured composition by drawing an 889 micrometer (35 mil) film of the composition onto a polytetrafluoroethylene sheet and curing using a Colight UV-6 by 3 Joules per square centimeters UV irradiation with 300 milliWatt per square centimeters intensity followed by 25° C. cure for 7 days. Cut dog bone shaped specimens form the resulting cured film use Drake dies with 5 mm of gauge width and 2.54 cm shoulder length. Perform tensile tests on an Instron 5566, averaging results of at least three replicates.

Characterize the scratch resistance (Pencil Hardness Measurement) of the cured compositions in terms of the following Pencil Scratch Test: Prepare a cured coating of a composition by casting and curing a 60 micrometers thick coating of a composition on an FR4 board (glass-reinforced epoxy laminated sheets) and cure by irradiating with 2 J/cm$^2$ of UVA+UVB radiation followed by allowing to set at 23° C. for 7 days. Conduct the characterization using a BYK-Gardner 5800 Wolf-Wilburn Pencil Hardness Tester with Derwent graphic pencils. Sharpen each pencil with a draftsman-type sharpener. Hold the sharpened lead point of each pencil at a 90 degree angle to horizontal on no. 400 grit abrasive paper and rub to obtain a smooth, flat, circular cross-section on the lead tip. Starting with the hardest grade of lead, place the tip of the pencil lead on a firmly positioned cured coating at a 45 degree angle relative to the surface of the coating. Push the pencil over the coating for a distance of at least 3 mm while applying sufficient pressure to wither scratch the film or rumple the edge of the lead. Repeat the test on an undamaged portion of the cured coating with the next softer grade of lead and continue repeating with softer grades of lead until testing with a grade of lead that does not scratch the coating. The hardest grade of lead that does not scratch the coating corresponds to the level of scratch resistance of the cured coating. The grades of lead for testing, in order from hardest to softest, is: 9H, 8H, 7H, 6H, 5H, 4H, 3H, 2H, H, F, HB, B, 2B, 3B, 4B, 5B, 6B, 7B, 8B, 9xxB.

Characterize Coefficient of Friction (CoF) by drawing a 60 micrometer thick film onto a FR4 board and UV and moisture curing to form a cured film. Place the cured film on the testing surface of a Texture Analyzer and place a 1056 gram sled and weight on the same with 2.54 centimeters (cm) by 1.54 cm piece of paper between the sled and the film. Run the test by moving the sled a distance of 42 mm along the film at a speed of 2.5 mm per second. The kinetic coefficient of friction (CoKF) is the average of the forces between 10 to 15 seconds during the test and is an average of 3-5 replicates of the test.

Molecular weight refers to weight-average molecular weight unless otherwise stated. Determine weight-average by triple detection gel permeation chromatography (GPC) using a Waters 515 pump, a Waters 717 autosampler and Waters 2410 differential refractometer. Conduct separation with two (300 mm by 7.5 mm) Polymer Laboratories PLgel 5 micrometer (μm) Mixed-C columns (molecular weight separation range of 200 to 2,000,000 Daltons), preceded by a PLgel 5 μm guard column (50 mm by 7.5 mm). Conduct analysis using HPLC grade toluene flowing at 1.0 milliliter (mL) per minute as the eluent, with the columns and detector at 45° C. Prepare the samples in toluene at 5 milligrams per mL concentration, solvate at room temperature for about three hours with occasional shaking, and filter through 0.45 μm polytetrafluoroethylene syringe filters prior to analysis. Use an injection volume of 75 microliters and collect data for 25 minutes. Perform data collection and analysis using ThermoLabsystems Atlas chromatography software and Polymer Laboratories Cirrus GPC software. Determine weight-average molecular weight relative to a calibration curve (3$^{rd}$ order) created using polystyrene standards over a molecular weight range of 580 to 2,300,00 Daltons.

For polysiloxanes, determine the subscript values for how many, or molar ratio of, siloxane units using $^{29}Si$, $^{13}C$ and

[1]H nuclear magnetic resonance spectroscopy (see, e.g., *The Analytical Chemistry of Silicones*, Smith, A. Lee, ed., John Wiley & Sons: NY, 1991, p. 347ff.).

The composition of the present invention can contain or be free of acrylic compounds. (Meth) acrylic-based curing systems suffer from the fact that they are sensitive to and inhibited by oxygen. The compositions of the present invention can be free of acrylic compounds and avoid the need to avoid oxygen as they cure.

The compositions of the present invention are useful, for example, as coating, encapsulating materials, potting and adhesive materials that can be cured by light and moisture for form a hard (Shore A hardness of at least 50, preferably at least 60) and scratch resistant (Pencil Scratch Resistance of at least 4B, preferably at least 3B) cured material.

The composition of the present invention comprises: (a) a silicon-free mercapto compound; (b) a linear polyorganosiloxane with phenyl and terminally unsaturated alkenyl groups; (c) a resinous polyorganosiloxane with phenyl and terminally unsaturated alkenyl groups; (d) a photoinitiator; (e) a moisture cure catalyst: (f) optionally, an alkoxy silane compound.

Desirably, the combined weight of components (a), (b) and (c) is 70 wt % or more, 80 wt % or more, 90 wt % or more, 95 wt % or more, 98 wt % or more, even 99 wt % or more while at the same time is less than 100 wt % of the composition weight. Desirably, determine wt % of components (a), (b) and (c) from the formula used to make the composition.

The molar ratio of mercapto groups to terminally unsaturated alkenyl groups in the composition is desirably 0.03 or more, 0.5 or more, 1.0 or more, 1.5 or more, 2.0 or more while at the same time is desirably 2.0 or less. Determine molar ratio of mercapto groups to unsaturated groups in the composition from the components used to make the composition.

Component (a)—Silicon-Free Mercapto Compound

The composition of the present invention comprises a silicon-free mercapto compound comprising 2 or more, preferably 3 or more mercapto groups (component (a)). Component (a) serves as a crosslinking agent as the composition cures, with the mercapto groups participating in thiol-ene reactions with terminally unsaturated alkenyl groups on polyorganosiloxanes of component (b).

The silicon-free mercapto compound is "silicon-free", meaning that the compound does not contain silicon atoms. However, the silicon-free mercapto compound does contain 2 or more and can contain 3 or more, 4 or more, 5 or more, 6 or more, 7 or more, 8 or more, 9 or more, even 10 or more mercapto groups and at the same time, while there is no known technical upper limit to the number of mercapto groups the silicon-free mercapto compound can contain, the silicon-free mercapto compound typically contains 10 or fewer, 9 or fewer, 8 or fewer, 7 or fewer, 6 or fewer, and can contain 5 or fewer, even 4 or fewer mercapto groups per molecule. The number of mercapto group is an average value for all the molecules of the silicon-free mercapto compound. Determine the number of mercapto groups per molecule of the silicon-free mercapto compound preferably from knowledge of the structure of the components used to prepare the composition. If it is unknown what materials are used to make the composition, determine the number of mercapto groups per molecule for component (a) using nuclear magnetic resonance (NMR) spectroscopy and elemental analysis.

Component (a) is present in the composition at a concentration of 5 weight-percent (wt %) or more, 6 wt % or more, 7 wt % or more, 8 wt % or more, 9 wt % or more, 10 wt % or more 12 wt % or more, 13 wt % or more, 14 wt % or more 16 wt % or more, 18 wt % or more, 20 wt % or more, 25 wt % or more, 30 wt % or more, 35 wt % or more or even 40 wt % or more while at the same time is typically present at a concentration of 45 wt % or less, 40 wt % or less, 35 wt % or less, 30 wt % or less, 25 wt % or less, 20 wt % or less, 19 wt % or less, 18 wt % or less, 17 wt % or less, 16 wt % or less, 15 wt % or less, 10 wt % or less, or even 8 wt % or less based on composition weight. Determine the wt % of component (a) in the composition preferably from the formula used to make the composition. If it is unknown how much of each component was included in making the composition, determine the wt % of component (a) by gel permeation chromatography (GPC), NMR and elemental analysis.

Component (a) can, and desirably does, comprise or consist of a combination of silicon-free mercapto compounds that includes both a dimercapto compound (that is a compound containing 2 mercapto group) and a mercapto compound having 3 or more mercapto groups.

Examples of suitable silicon-free dimercapto compounds include those having the following structure:

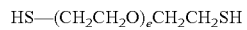

where subscript "e" is the average value of ethoxy groups per molecule and has a value in a range of one to five.

Examples of silicon-free mercapto compounds having 3 or more mercapto groups include any one or any combination of more than one compound selected from a group consisting of trimethylolpropane tris(3-merctopopropionate) and pentaerythritol tetrakis (3-mercaptoproprionate).

Component (b)—Linear Polyorganosiloxane

The composition of the present invention comprises a linear polyorganosiloxane containing one or more than one terminally unsaturated alkenyl group, one or more than one alkoxysilyl group and 40 mole-percent or more phenyl groups relative to silicon atoms (component (b)). The linear polyorganosiloxane comprising predominately D-type siloxane units relative to other siloxane units. Preferably, the linear polyorganosiloxane consists of M-type and D-type siloxane units. However, the linear polyorganosiloxane can comprise an average of zero, one or two T-type or Q-type siloxane units per molecule.

Terminally Unsaturated Alkenyl Group. Component (b) has an average of one or more, preferably 2 or more and can have 3 or more, 4 or more, 5 or more, 6 or more 7 or more, 8 or more, 9 or more, or even 10 or more while at the same time typically has 10 or fewer, 9 or fewer, 8 or fewer, 7 or fewer, 6 or fewer, 5 or fewer, 4 or fewer, 3 or fewer or even 2 or fewer terminally unsaturated alkenyl groups per molecule. Determine the average number of terminally unsaturated alkenyl groups per molecule of component (b) preferably from the identity of the structure of the compound used for component (b) when preparing the composition. If it is unknown what compound was used for component (b) in preparing the composition, determine the number of terminally unsaturated alkenyl groups per molecule of component (b) by $^1$H, $^{13}$C and $^{29}$Si NMR spectroscopy.

The terminally unsaturated alkenyl group is typically bonded to a silicon atom of an M-type or D-type siloxane unit of the polyorganosiloxane, preferably, an M-type.

Desirably, the polyorganosiloxane of component (b) has a terminally unsaturated alkenyl group on one or more, possibly even two or more terminal silicon atoms. A terminal silicon atom is part of an M-type unit in the polyorganosiloxane. Desirably, the terminally unsaturated alkenyl group is itself terminal meaning the unsaturation is between a terminal and neighboring carbon atom in the group. For example, the terminally unsaturated alkenyl group is desirably a vinyl group. The terminally unsaturated alkenyl group is preferably attached directly to a silicon atom.

Alkoxysilyl Group. The polyorganosiloxane of component (b) also contains one or more than one alkoxysilyl group. The alkoxysilyl groups are needed to participate in the moisture cure reaction. An alkoxysilyl group has an alkoxy group (—OR) extending off from a silicon atom, where R is selected from a group consisting of $C_{1-8}$ saturated hydrocarbyl groups (such as, for example, methyl, ethyl, propyl, butyl, pentyl, hexyl, heptyl and octyl groups). Component (b) can have one or more, 2 or more, 3 or more 4 or more, and even 5 or more alkoxysilyl groups per molecule while at the same time typically contains 10 or fewer, even 5 or fewer alkoxysilyl groups per molecule. The number of alkoxysilyl groups is an average number of alkoxysilyl groups per molecule. Desirably, determine the average number of alkoxysilyl groups from the materials used to make a composition of the present invention. If the materials used to make the composition are unknown, determine average number of alkoxysilyl groups by NMR spectroscopy and infrared spectroscopy.

The alkoxysilyl group can have a single alkoxy attached to a silicon atom (monoalkoxysilyl), or have two alkoxy groups attached to single silicon atom (dialkoxy group), or have three alkoxy groups attached to a single silicon atom (trialkoxy group). The polyorganosiloxane of component (b) can have any combination of monoalkoxysilyl groups, dialkoxysilyl groups and trialkoxysilyl groups. For example, component (b) can only have trialkoxysilyl groups as the requisite alkoxysilyl group. As an alternative example, component (b) can have only dialkoxysilyl groups as the requisite alkoxysilyl group. As yet another alternative example, component (b) can contain a combination of dialkoxysilyl groups and trialkoxysilyl groups.

Desirably, the alkoxysilyl group is terminal to the polyorganosiloxane to make the alkoxysilyl group most accessible (for example, least sterically hindered) for participating in curing reactions. The alkoxy group(s) can be part of a terminal M-type siloxane unit of the polyorganosiloxane.

Phenyl Groups. The linear polyorganosiloxane of component (b) contains phenyl groups, preferably bonded to silicon atoms of the polyorganosiloxanes backbone. The presence of phenyl groups on the polyorganosiloxane are believed to be what make component (a) and component (b) sufficiently compatible so as to enable the present composition to cure into not only a hard cured composition but a scratch resistant one as well. If components (a) and (b) are not sufficiently compatible with one another, then either insufficient concentrations of each will be present in the composition to allow curing to a hard cured composition or phase separation will occur in the composition to such an extent so as to cause weakness in the cured composition evidenced by poor scratch resistance.

To achieve suitable compatibility between the silicon-free mercapto compound (component a) and the linear polyorganosiloxane (component b), component b contains 40 mole-percent (mol %) or more phenyl groups relative to silicon atoms in component (b). Desirably, component (b) contains 40 mol % or more, 45 mol % or more, 50 mol % or more, 55 mol % or more, 60 mol % or more, 65 mol % or more, 70 mol % or more, 75 mol % or more, 80 mol % or more, 90 mol % or more, 99 mol % or more, 100 mol % or more, 110 mol % or more, 120 mol % or more, 130 mol % or more, 140 mol % or more, and even 150 mol % or more phenyl groups relative to silicon atoms in component (b) while at the same time component (b) typically contains 200 mol % or fewer and can contain 190 mol % or fewer, 180 mol % or fewer, 170 mol % or fewer, 160 mol % or fewer, 150 mol % or fewer, 140 mol % or fewer, 130 mol % or fewer, 120 mol % or fewer, 110 mol % or fewer, 100 mol % or fewer, 95 mol % or fewer, and even 90 mol % or fewer phenyl groups relative to silicon atoms in component (b). Higher concentrations of phenyl groups seem to be desirable to increase compatibility between components (a) and (b). The phenyl groups can be substituted or unsubstituted. An unsubstituted phenyl group has the formula—$C_6H_5$ (benzene with one hydrogen atom removed). A substituted phenyl group is a phenyl group where one or more than one of the hydrogen atoms has been replaced with another chemical moiety such as a halide, alkyl, hydroxyl, or vinyl unsaturated group (such as vinyl). Notably, the composition as a whole can, and preferably does, have on average a mol % phenyl groups relative to silicon atoms in the aforementioned mol %. Desirably, determine the mol % phenyl groups relative to silicon atoms from the materials used to make a composition of the present invention. If the materials used to make the composition are unknown, determine mol % phenyl groups relative to silicon atoms using $^1$H, $^{13}$C and $^{29}$Si NMR spectroscopy.

The linear polyorganosiloxane desirably has the following structure:

$$(R^1R_2SiO_{1/2})(R^2{}_2SiO_{2/2})_{a'}(PhRSiO_{2/2})_a(XR_2SiO_{1/2})$$

where:

R is independently in each occurrence selected from a group consisting of $C_{2-8}$ terminally unsaturated alkenyl groups, $C_{1-8}$ alkyl groups, $C_{1-8}$ substituted alkyl groups and phenyl groups. Desirably, R is independently in each occurrence selected from a group consisting of methyl and phenyl groups.

$R^1$ is selected from a group consisting of $C_{2-8}$ terminally unsaturated alkenyl groups. Examples of suitable $C_{2-8}$ terminally unsaturated alkenyl groups include vinyl, allyl, butenyl, pentenyl, hexenyl, heptenyl and octenyl. Preferably R' is selected from a group consisting of vinyl, allyl and hexenyl groups.

$R^2$ is independently in each occurrence selected from a group consisting of $C_{2-8}$ terminally unsaturated alkenyl groups, $C_{1-8}$ saturated alkyl groups (such as, for example, methyl (—$CH_3$), ethyl (—$CH_2CH_3$), propyl (—$CH_2CH_2CH_3$), butyl, pentyl, hexyl, heptyl, octyl groups) and X. Preferably, $R^2$ is selected from methyl and vinyl groups.

Ph is a phenyl group.

Subscript a is the average number of ($PhRSiO_{2/2}$) units per molecule and is typically 2 or more, preferably 4 or more, 6 or more, 8 or more, 10 or more, 12 or more, 14 or more, 16 or more, 18 or more, even 20 or more, while at the same time is typically 800 or less and can be 600 or less, 400 or less, 200 or less, 180 or less, 160 or less, 140 or less, 120 or less, 100 or less, 80 or less, 60 or less, 50 or less, 40 or less, 25 or less and even 20 or less.

Subscript a' is the average number of (($R^2$)$_2SiO_{2/2}$) units per molecule and is a value of zero or more and can be 2 or more, 3 or more, 4 or more, 5 or more, 6 or more, 7 or more, 8 or more, 9 or more, 10 or more while at the same time is generally 200 or less and can be 180 or less, 160 or less, 140 or less, 120 or less, 100 or less, 80 or less, 60 or less, 40 or less and even 20 or less. Desirably, subscript a' is a smaller number than subscript a.

Typically, the linear polyorganosiloxane contains zero or more and can contain 2 or more, 2 or more, 4 or more, 4 or more, 6 or more, 7 or more, 8 or more, 9 or more even 10 or more while at the same time typically contains 40 or fewer, 20 or fewer, 10 or fewer and even 5 or fewer $(R^2{}_2SiO_{2/2})$ units containing an X group.

X is an alkoxysilyl group. Each occurrence of X is independently selected from alkoxysilyl groups, meaning that two X groups in a molecule can be the same or different alkoxysilyl group. The alkoxysilyl group can be a mono-alkoxysilyl, dialkoxysilyl, or trialkoxysilyl group.

One example of a suitable alkoxysilyl group has the following structure:

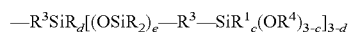

$$-R^3SiR_d[(OSiR_2)_e-R^3-SiR^1{}_c(OR^4)_{3-c}]_{3-d}$$

where: R and $R^1$ are as defined above; $R^3$ is independently in each occurrence selected from a group consisting of $C_{1-8}$ saturated alkylene groups (such as, for example, methylene (—$CH_2$—), ethylene (—$CH_2CH_2$—), propylene (—$CH_2CH_2CH_2$—), butylene (—$CH_2(CH_2)_2CH$—), pentylene (—$CH_2(CH_2)_3CH$—), hexylene (—$CH_2(CH_2)_4CH$—), heptylene (—$CH_2(CH_2)_5CH$—), and octylene (—$CH_2(CH_2)_6CH$—) groups), $R^4$ is selected from a group consisting of $C_{1-8}$ alkyl groups, $C_{1-8}$ substituted alkyl groups, and subscript c is zero, one or two, and subscript d is a value of zero, one or two, and subscript e is a value in a range of 1-3. Desirably, the X group is characterized by the following: $R^4$ is methyl, $R^3$ is ethylene in each occurrence, R is independently in each occurrence selected from a group consisting of methyl and ethyl (preferably, R in each occurrence is methyl), subscript c has a value of zero and subscript d has a value of one or two (preferably, subscript d is one).

An example of a suitable polyorganosiloxane for use as component (b) has the aforementioned structure where each R is methyl, $R^1$ is vinyl, subscript a is 20 and X is:

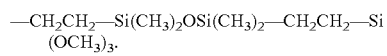

—$CH_2CH_2$—$Si(CH_3)_2OSi(CH_3)_2$—$CH_2CH_2$—Si$(OCH_3)_3$.

The linear polyorganosiloxane is typically present in the composition at a concentration of 10 wt % or more, 20 wt % or more, 30 wt % or more, 40 wt % or more, 50 wt % or more and even 60 wt % or more while at the same time is typically present at a concentration of 80 wt % or less, 70 wt % or less, 60 wt % or less, even 50 wt % or less based on composition weight.

Component (c)—Resinous Polyorganosiloxane

In order to achieve the desired hardness in the cured composition, the present composition also comprises a resinous polyorganosiloxane (component c). Component c contains one or more than one terminally unsaturated alkenyl group and 20 mole-percent or more phenyl groups relative to silicon atom.

Terminally Unsaturated Alkenyl Group. The resinous polyorganosiloxane has an average of one or more, preferably 2 or more and can have 3 or more, 4 or more, 5 or more, 6 or more 7 or more, 8 or more, 9 or more, or even 10 or more while at the same time typically has 10 or fewer, 9 or fewer, 8 or fewer, 7 or fewer, 6 or fewer, 5 or fewer, 4 or fewer, 3 or fewer or even 2 or fewer terminally unsaturated alkenyl groups per molecule. Determine the average number of terminally unsaturated alkenyl groups per molecule of the resinous polyorganosiloxane preferably from the identity of the structure of the compound used for the resinous polyorganosiloxane when preparing the composition. If it is unknown what compound was used for the resinous polyorganosiloxane in preparing the composition, determine the number of terminally unsaturated alkenyl groups per molecule of the resinous polyorganosiloxane by $^1H$, $^{13}C$ and $^{29}Si$ NMR spectroscopy. The terminally unsaturated alkenyl group is typically bonded to a silicon atom of an M-type, D-type, and/or T-type siloxane unit, preferably an M-type siloxane unit, of the polyorganosiloxane.

Desirably, the polyorganosiloxane of the resinous polyorganosiloxane has a terminally unsaturated alkenyl group on one or more, possibly even two or more terminal silicon atoms. A terminal silicon atom is part of an M-type unit in the polyorganosiloxane. Desirably, the terminally unsaturated alkenyl group is itself terminal meaning the unsaturation is between a terminal and neighboring carbon atom in the group. For example, the terminally unsaturated alkenyl group is desirably a vinyl group. The terminally unsaturated alkenyl group is preferably attached directly to a silicon atom.

Phenyl Groups. The resinous polyorganosiloxane contains phenyl groups, preferably bonded to silicon atoms of the polyorgansiloxanes backbone. The presence of phenyl groups on the polyorganosiloxane is believed to be what make component (a) and component (c) sufficiently compatible so as to enable the present composition to cure into not only a hard cured composition but a scratch resistant one as well. If components (a) and (c) are not sufficiently compatible with one another, then either insufficient concentrations of each will be present in the composition to allow curing to a hard cured composition or phase separation will occur in the composition to such an extent so as to cause weakness in the cured composition evidenced by poor scratch resistance.

To achieve suitable compatibility between the silicon-free mercapto compound (component a) and the resinous polyorganosiloxane, the resinous polyorganosiloxane contains 40 mole-percent (mol %) or more phenyl groups relative to silicon atoms in the resinous polyorganosiloxane. Desirably, the resinous polyorganosiloxane contains 20 mol % or more, 25 mol % or more, 30 mol % or more, 35 mol % or more, 40 mol % or more, 45 mol % or more, 50 mol % or more, 55 mol % or more, 60 mol % or more, 65 mol % or more, 70 mol % or more, 75 mol % or more, 80 mol % or more, 90 mol % or more, 99 mol % or more, 100 mol % or more, 110 mol % or more, 120 mol % or more, 130 mol % or more, 140 mol % or more, and even 150 mol % or more phenyl groups relative to silicon atoms in the resinous polyorganosiloxane while at the same time the resinous polyorganosiloxane typically contains 200 mol % or fewer and can contain 190 mol % or fewer, 180 mol % or fewer, 170 mol % or fewer, 160 mol % or fewer, 150 mol % or fewer, 140 mol % or fewer, 130 mol % or fewer, 120 mol % or fewer, 110 mol % or fewer, 100 mol % or fewer, 95 mol % or fewer, and even 90 mol % or fewer phenyl groups relative to silicon atoms in the resinous polyorganosiloxane. Higher concentrations of phenyl groups seem to be desirable to increase compatibility between components (a) and (c). The phenyl groups can be substituted or unsubstituted. An unsubstituted phenyl group has the formula —$C_6H_5$ (benzene with one hydrogen atom removed). A substituted phenyl group is a phenyl group where one or more than one of the hydrogen atoms has been replaced with another chemical moiety such as a halide, alkyl, hydroxyl, or vinyl unsaturated group (such as vinyl). Notably, the composition as a whole can, and preferably does, have on average a mol % phenyl groups relative to silicon atoms in the aforementioned mol %. Desirably, determine the mol % phenyl groups relative to silicon atoms from the materials used to make a composition of the present invention. If the materials used to make the composition are unknown, determine mol % phenyl groups relative to silicon atoms using $^1$H, $^{13}$C and $^{29}$Si NMR spectroscopy.

Desirably, the resinous polyorganosiloxane has the following structure:

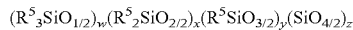
$$(R^5_3SiO_{1/2})_w(R^5_2SiO_{2/2})_x(R^5SiO_{3/2})_y(SiO_{4/2})_z$$

where:

$R^5$ is independently in each occurrence selected from a group consisting of $C_{2-8}$ alkenyl groups, $C_{1-8}$ alkyl groups, phenyl groups, alkoxy groups and alkoxysilyl groups; preferably the alkenyl groups are terminally unsaturated alkenyl groups. Desirably, at least one $R^5$, preferably of a $(R^5_3SiO_{1/2})$ unit and/or a $(R^5_2SiO_{2/2})$ unit, is a $C_{2-8}$ terminally unsaturated alkenyl group.

Subscripts w, x, y and z correspond to the average mol % of the corresponding siloxane unit based on moles of siloxane units in the molecule and wherein: w is zero or more, 10 or more, 15 or more, 20 or more, 25 or more, even 30 or more, 35 or more, 40 or more, 45 or more, even 50 or more while at the same time is typically 75 or less, 50 or less, 45 or less, 40 or less, 35 or less, 30 or less, 25 or less, 20 or less, 15 or less, or even 10 or less; x is zero or more, 10 or more 15 or more, 20 or more, 30 or more, 40 or more, even 50 or more while at the same time is typically 70 or less, 60 or less, 50 or less, 40 or less, 30 or less, 20 or less or even 10 or less; y is zero or more, 10 or more, 20 or more, 30 or more, 40 or more, 50 or more, 60 or more, 70 or more, 75 or more, even 80 or more while at the same time is typically 100 or less, 90 or less, 80 or less, or even 75 or less; z is zero or more, 5 or more, 10 or more 15 or more, 20 or more, 30 or more, 40 or more, even 50 or more while at the same time is typically 60 or less, 50 or less, 40 or less, 30 or less, 20 or less or even 10 or less; provide that (w+x+y+z) equals 100, (y+z) is 20 or more, (x+w) is 10 or more, and the aforementioned required concentration of phenyl groups and alkenyl groups is met for component c.

The weight-average molecular weight is typically greater than 350 Daltons (Da) and can be 500 Da or more, 750 Da or more, 1,000 Da or more, 2,000 Da or more, 2,500 Da or more, 5,000 Da or more, 10,000 Da or more, 20,000 Da or more, 30,000 Da or more, even 40,000 Da or more while at the same time is typically 100,000 Da or less and can be 45,000 Da or less, 40,000 Da or less, 30,000 Da or less, 20,000 Da or less, 10,000 Da or less, 5,000 Da or less, even 2,500 Da or less.

An example of a suitable resinous polyorganosiloxane for use as component (c) has the following structure:

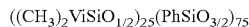
$$((CH_3)_2ViSiO_{1/2})_{25}(PhSiO_{3/2})_{75}$$

where Vi is a vinyl group and Ph is a phenyl group and wherein the molecule has a weight-average molecular weight of 1590 Da.

Typically, the concentration of the resinous polyorganosiloxane is 30 wt % or more and can be 40 wt % or more, even 50 wt % or more while at the same time is generally 70 wt % or less, preferably 60 wt % or less and can be 50 wt % or less based on composition weight.

Component (d)—Photoinitiator

The composition of the present invention a photoinitiator (component (d)). A photoinitiator generates free radicals when exposed to light. Desirably, the photoinitiator is a visible light photoinitiator, a UV light photoinitiator, or a combination thereof. Most preferably, the photoinitiator is a UV light photoinitiator.

A visible light photoinitiator is a molecule that generates free radicals upon expose to visible light (wavelength in a range of 390 to 700 nanometers). Suitable visible light photoinitiators include any one or any combination of more than one compound selected from a group consisting of camphoquinone peroxyester initiators, non-fluorene carboxylic acid peroxyester initiators and alkyl thioxanthones such an isopropyl thioxanthone.

A UV light photoinitiator is a molecule that generates free radicals upon exposure to ultraviolet light. Suitable UV photoinitiators include any one or any combination of more than one compound selected from a group consisting of benzophenone, substituted benzophenones, acetophenone, substituted acetophenone, benzoin and its alkyl esters, xanthone, and substituted xanthone. Particularly desirable UV photoinitiators include diethoxyacetophenone (DEAP), benzoin methyl ether, benzoin ethyl ether, benzoin isopropyl ether, diethoxyxanthone, chloro-thioxanthone, azo-bisisobutyronitrile, N-methyldiethanolaminebenzophenone, 2-hydroxy-2-methylpropiophenone, and any combinations thereof.

Typically, the photoinitiator is present at a concentration of 0.1 wt % or more, preferably 0.5 wt % or more, 1.0 wt % or more, 1.5 wt % or more, 2.0 wt % or more, 2.5 wt % or more, 3.0 and at the same time is desirably 5.0 wt % or less, preferably 4.0 or less, 3.0 or less, or 2.0 or less based on composition weight.

Component (e)—Moisture Cure Catalyst

The composition of the present invention comprises a moisture cure catalyst (component (e)). Moisture cure catalysts enhance the rate at which the alkoxysilyl groups on the polyorganosiloxane react with moisture to cure. Suitable moisture cure catalysts include any one or combination of more than one organo-metal catalysts selected from a group consisting of titanium compounds, tin compounds, and zirconium compounds. Examples of suitable titanium compounds include tetraisopropylorthotitanate, tetrabutoxyorthotitanate,di(isopropoxy)bis(ethylacetoacetate)titanium, di(isopropoxy)bis(methylacetoacetate)titanium, di(isopropoxy)bis(acetylacetonate)titanium. Examples of suitable tin compounds include dibutyltin dilaurate and dibutyltin dioctoate. Examples of suitable zirconium compounds include tetra(isopropoxy)zirconium, tetra(n-butoxy)zirconium, tetra(t-butoxy)zirconium, di(isopropoxy)bis(ethylacetoacetate)zirconium, di(isopropoxy)bis(methylacetoacetate)zirconium, and di(isopropoxy)bis(acetylacetonate) zirconium.

Typically, the concentration of moisture cure catalyst is 0.1 wt % or more, 0.5 wt % or more, one wt % or more, 2 wt % or more, and even 3 wt % or more while at the same time is generally 3 wt % or less, 2 wt % or less or even one wt % or less relative to composition weight.

Component (f)—Alkoxy Silane

Compositions of the present invention can optionally further comprise an alkoxy silane. The alkoxy silane serves as a reactive diluent. Reactive diluents serve to lower the viscosity of the composition relative the composition without the reactive diluent. However, unlike unreactive diluents, reactive diluents participate in the curing reaction of the composition and become bound into the resulting cured composition precluding them from being extractible components from the cured reaction.

Surprisingly, alkoxy silanes have been found to both work as reactive diluents and enhance final properties of the cured composition, presumably by enhancing the compatibility of the composition components. Surprisingly, when the alkoxy silane reactive diluent is present in the composition, the composition cures to a cured composition having higher scratch resistance and/or hardness relative to an identical composition without the alkoxy silane. Desirably, the alkoxy silane is a dialkoxy silane, a trialkoxy silane or a combination of dialkoxy and trialkoxy silanes. Most preferably, the alkoxy silane is a trialkoxy silane.

The alkoxy silane compound desirably has the following structure:

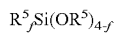

$R^5_f Si(OR^5)_{4-f}$ where subscript f is one, two or three (preferably one or two, most preferably one) and $R^5$ is independently in each occurrence selected from a group consisting of methyl, ethyl, propyl and butyl groups. Examples of suitable alkoxy silane compounds include any one or combination of more than one selected from methyltrimethoxy silane, ethyltriethoxy silane, and dimethyldimethoxy silane.

The composition of the present invention can contain zero wt % or more, 0.5 wt % or more, one wt % or more, 2 wt % or more, 3 wt % or more, 4 wt % or more, 5 wt % or more, 6 wt % or more, 7 wt % or more 8 wt % or more, 9 wt % or more, even 10 wt % or more while at the same time typically contains 20 wt % or less, 19 wt % or less, 18 wt % or less, 17 wt % or less, 16 wt % or less, 15 wt % or less, 14 wt % or less, 13 wt % or less, 12 wt % or less, 11 wt % or less or 10 wt % or less of the alkoxy silane compound based on composition weight.

Particular benefit in properties of the cured composition is surprisingly evident when the alkoxy silane is present at a concentration of 2 wt % or more, 3 wt % or more, 4 wt % or more, and even 5 wt % or more while at the same time 10 wt % or less, or even 8 wt % or less based on composition weight.

Examples

Materials: Pentaerythritol tetrakis (3-mercaptopropionate); Tetraethyleneglycol bis (3-mercaptopropionat; Trimethylolpropane, and butylated hydoxytoluene are purchased from Aldrich; 1,8 dimercapto-3,6-dioxanoctane is available from Arkema; phenyl based silicone resins and polymers are can be made according to teachings in U.S. Pat. No. 7,527,871B2; 2-Hydroxy-2-methylpropiophenone is available from IGM resin, diisopropoxytitanium bis(ethylacetoacetate); Pt catalyst; Methyltrimethoxysilane, dimethyl methyl (mercaptopropyl) siloxane, and dimethylvinylated siloxanes are commercial available from Gelest;

Compound A. In a 2 Liter Atlas batch reactor, 500 g of a vinyl ended-methylphenylsiloxane polymer ($M^{Vi}_2 D^{Ph}_{20}$) was mixed with the 47.3 g of $HMe_2SiOSiMe_2C_2H_4Si(OMe)_3$. The mixture was agitated for 10 minutes at 350 revolutions per minute (rpm), and then 0.27 g of Pt catalyst (2.15 wt % Pt catalyst in Toluene) was added into the mixture. The reaction mixture agitated at room temperature under nitrogen for 3 hours. The infrared spectrum of the sample showed a complete loss of SiH peak at 2170 cm$^{-1}$, indicating the completion of the hydrosilylation reaction. Part of the vinyl group on the siloxane converted to moisture curable trialkoxy containing functionality and result in Compound A. $M^{Vi}D^{Ph}_{20}M^A$ {A=—$CH_2$—$CH_2$—$SiMe_2OSiMe_2CH_2CH_2Si(OMe)_3$}

Blend B. In a 500 g of Atlas batch reactor, 30 g of a siloxane with composition of $M^{Vi}_3 T^{Ph}$ was added to 70 g of a silicone resin ($M^{Vi}_{25} T^{Ph}_{75}$), then 0.066 g of Pt catalyst (2.15 wt % Pt catalyst in Toluene) was added into the mixture. The mixture was agitated for 10 minutes at 350 rpm, and then 42 g $HMe_2SiOSiMe_2C_2H_4Si(OMe)_3$ was slowly added to the mixture by addition funnel in 20 minutes. The mixture was agitated at room temperature for 30 minutes under nitrogen, and then heat to 80° C. and was agitated at 80° C. for 1 hour. The reaction was then cool down to room temperature. The infrared spectrum of the sample showed a complete loss of SiH peak at 2170 cm$^{-1}$, indicating the completion of the hydrosilylation reaction. The resulting mixture is Blends B. 70 wt % $M^{Vi}_x T^{Ph}_{75} M^A_y$ (x+y=25) mixed with 30 wt % $M^{Vi}_m T^{Ph} M^A_n$ (m+n=3); A=—$CH_2$—$CH_2$—$SiMe_2OSiMe_2CH_2CH_2Si(OMe)_3$ Compound C. 163.6 g of 55 wt % siloxane resin $M^{Vi}_{25} T^{Ph}_{75}$ in toluene was added in a 500 mL round bottle, then 60 g of compound A was slowly added to the siloxane resin with an agitation speed of 350 rpm. After addition, the toluene was stripped through a rotovap and result in Compound C. {60 wt % $M^{Vi}_{25} T^{Ph}_{75}$ mixed with 40 wt % $M^{Vi}D^{Ph}_{20}M^A$ (A=—$CH_2$—$CH_2$—$SiMe_2OSiMe_2CH_2CH_2Si(OMe)_3$}.

Example 1. In a 100 milliliters (mL) dental cup, 60 grams (g) of compound C and 9.2 g of trimethylolpropane tris(3-mercaptopropionate) was added to make the SH and vinyl mole ratio of 1:1, the mixture was mixed in a dental mixer at 1000 rpm for 20 s, and then mixed at 2000 rpm for 30 s. Then 0.7 g of methyltrimethoxy silane and 0.21 g of 2-Hydroxy-2-methylpropiophenone were added and mixed at 2000 rpm for 30 s. Finally, 0.11 g of diisopropoxytitanium bis(ethylacetoacetate) was added to the mixture and was mixed at 2000 rpm for 30 s. The sample was then packaged in 30 mL syringe and deaired. The sample was subjected to Mechanical Testing as described above. The cured material has a tensile strength of 1.4 Newtons per square millimeter (N/mm$^2$), a hardness of Shore A 66±2, and pencil scratch hardness of B.

Example 2 (compare with Example 1, different structure of SH organics as X-linker could also lead to hard anti-scratch coating). In a 100 mL of dental cup, 60 g of compound C and 4.6 g of trimethylolpropane tris(3-mercaptopropionate) and 4.3 g of pentaerythritol tetrakis(3-mercaptopropionate) were added make the SH and vinyl ratio of 1:1, the mixture was mixed in a dental mixer at 1000 rpm for 20 s, and then mixed at 2000 rpm for 30 s. Then 0.7 g of methyltrimethoxy silane and 0.21 g of 2-hydroxy-2-methylpropiophenone were added and mixed at 2000 rpm for 30 s. Finally 0.11 g of diisopropoxytitanium bis(ethylacetoacetate) was added to the mixture and was mixed at 2000 rpm for 30 s. The sample was then packaged in 30 mL syringe and deaired. Cure the material and test it for Shore A hardness, tensile strength and pencil scratch hardness as described herein above. The cured material has a hardness of Shore A 72±3, tensile strength of 2.29 N/mm$^2$, and pencil scratch hardness of H.

Example 3 (Compare with Exs 1 and 2; different phenyl siloxanes compositions in the formulation also provides hard anti-scratch coating). In a 100 ml of dental cup, 10 g of Compound B, 40 g of compound C, and 9.4 g of Trimethylolpropane tris(3-mercaptopropionate) were added make the SH and vinyl ratio of 1:1, the mixture was mixed at 1000 rpm for 20 s, and then mixed at 2000 rpm for 30 s. Then 0.7 g of methyltrimethoxy silane and 0.21 g of 2-Hydroxy-2-methylpropiophenone was added and mixed at 2000 rpm for 30 s. Finally 0.11 g of diisopropoxytitanium bis(ethylacetoacetate) was added to the mixture and was mixed at 2000 rpm for 30 s. The sample was then packaged in 30 mL syringe and deaired. Cure the material and test it for Shore A hardness, tensile strength and pencil scratch hardness as described herein above. The cured material has a hardness of shore A 72±2, tensile strength of 2.21 N/mm$^2$, and pencil scratch hardness of H.

Example 4. In a 60 mL dental cup, 30 g of Compound C and 3.82 g of 1,8 dimercapto-3,6-dioxanoctane were added. The mixture was mixed in a dental mixer at 2000 rpm for 30 s then 0.106 g of butylated hydroxytoluene and 1.42 g of methyltrimethoxysilane mixture was added and mixed at 2000 rpm for 30 s. Finally, 0.271 g and 2-hydroxy-methyl-propiophenone and 0.068 g of diisopropoyxytitanium bis (ethylacetoacetate) were added to the mixture and the mixture was mixed at 2000 rpm for 60 s. The sample was then packaged in 30 mL syringe and deaired. Cure the material and test it for Shore A hardness, tensile strength and pencil scratch hardness as described herein above. The cured sample has a Shore A hardness of 54±2, a tensile strength of 1.17 N/mm$^2$, and a pencil scratch hardness of 3B.

Comparative Example A (compare with Example 1, demonstrate the phenyl vinyl silicone is not compatible with SH functionalized methyl based silicone). In a 40 ml dental cup, 10 g of Compound C, and 12.7 g of dimethyl methyl (mercaptopropyl) siloxane which contains 3.5 wt % SH were added make the SH and vinyl ratio of 1:1. The mixture was mixed at 1000 rpm for 20 s, and then mixed at 2000 rpm for 30 s. After dental mixing, it is still not fully mixed. Then 0.219 g of premade 0.17 wt % butylated hydoxytoluene in methyltrimethoxy silane and 0.079 g of 2-Hydroxy-2-methylpropiophenone were added and mixed at 2000 rpm for 30 s. Finally, 0.041 g of diisopropoxytitanium bis(ethylacetoacetate) was added to the mixture and was mixed at 2000 rpm for 30 s; then followed by another 2000 rpm for 120 s. The mixture was unable to be mixed. The final mixture contains a very thick phenyl silicone resin polymer phase and a very dilute phase with other compositions. The sample did not cure under UV irradiation due to the separated vinyl polymer/resin phase and mercaptan silicone phase.

Comparative Example B. (compare with Example 1, demonstrate the vinyl methyl based silicone is not compatible with SH functionalized organics). In a 40 ml dental cup, 6.8 g of dimethylvinylated siloxane ($M^{Vi}D_nM^{Vi}$) which contains 0.45 wt % vinyl; 7 g of dimethylvinylated siloxane which contains 1.2 wt % vinyl, and 4 g of trialkoxy and vinyl functional siloxanes which has 0.45 wt % vinyl content and 0.8 wt % trialkoxy group, 3.2 g of hexamethyldisilazane treated fumed silica were mixed at 1000 rpm for 20 s, the mixture is translucent. Then 0.68 gram of trimethylolpropane tris(3-mercaptopropionate) were added to make SH and vinyl ratio of 1:1. The mixture was mixed at 2000 rpm for 30 s. After fully mixing, the mixture becomes white. Then 0.219 g of premade 0.17 wt % butylated hydoxytoluene in methyltrimethoxy silane and 0.075 g of 2-Hydroxy-2-methylpropiophenone were added and mixed at 2000 rpm for 30 s. Finally 0.040 g of diisopropoxytitanium bis(ethylacetoacetate was added to the mixture and was mixed at 2000 rpm for 30 s. The final formulation is milk white. A 35 mil wet film as made by draw-down formulation on a Teflon sheet. The coating was then went through Colight UV-6 by 2 J/cm$^2$ UV irradiation with 300 mW/cm$^2$ intensity. The coating remained liquid after UV irradiation.

Comparative Example C. (compare with Example 1, demonstrate methyl based vinyl and SH functionalized silicone are compatible but lead to low cross-linking density and to low hardness). In a 100 ml dental cup, 4.6 g of dimethyl methyl(mercaptopropyl) siloxane (which contains 3.5 wt % SH; 6.8 g of dimethylvinylated siloxane which contains 0.45 wt % vinyl; 7 g of dimethylvinylated siloxane which contains 1.2 wt % vinyl, and 4 g of trialkoxy and vinyl functional siloxanes which has 0.45 wt % Vinyl content and 0.8 wt % trialkoxy group, 3.2 g of hexamethyldisilazane treated fumed silica, were added to make SH and vinyl ratio of 1:1. The mixture was mixed at 1000 rpm for 20 s, and then mixed at 2000 rpm for 30 s. 0.219 g of premade 0.17 wt % butylated hydoxytoluene in methyltrimethoxy silane and 0.075 g of 2-Hydroxy-2-methylpropiophenone were added and mixed at 2000 rpm for 30 s. Finally 0.040 g of diisopropoxytitanium bis(ethylacetoacetate was added to the mixture and was mixed at 2000 rpm for 30 s. The sample was then packaged in 30 mL syringe and deaired. Cure the material and test it for Shore A hardness, tensile strength and pencil scratch hardness as described herein above. The cured material has a hardness of Shore A 25±1, tensile strength of 0.61 N/mm$^2$.

Comparative Example D. (Increase the SH content in the methylsilicone lead to incompatibility of vinyl silicone polymer/resin with cross-linker). In a 100 ml dental cup, 2.3 g of dimethyl methyl(mercaptopropyl) siloxane (which contains 7.0 wt % SH; 6.8 g of dimethylvinylated siloxane which contains 0.45 wt % vinyl; 7 g of dimethylvinylated siloxane which contains 1.2 wt % vinyl, and 4 g of trialkoxy and vinyl functional siloxanes which has 0.45 wt % Vinyl content and 0.8 wt % trialkoxy group, 3.2 g of hexamethyldisilazane treated fumed silica, were added to make SH and vinyl ratio of 1:1. The mixture was mixed at 1000 rpm for 20 s, and then mixed at 2000 rpm for 30 s. The mixture turned to whitish haze. 0.219 g of premade 0.17 wt % butylated hydoxytoluene in methyltrimethoxy silane and 0.075 g of 2-Hydroxy-2-methylpropiophenone were added and mixed at 2000 rpm for 30 s. Finally 0.040 g of diisopropoxytitanium bis(ethylacetoacetate was added to the mixture and was mixed at 2000 rpm for 30 s. Cure and test the material for Shore A hardness and tensile strength as described herein above. The cured material has a hardness of Shore A 20±1.

TABLE 1

| Component (grams)/Property | Ex 1 | Ex 2 | Ex 3 | Ex 4 | Comp Ex A | Comp Ex B | Comp Ex C | Comp Ex D |
|---|---|---|---|---|---|---|---|---|
| 60 wt % $M^{Vi}_{25}T^{Ph}_{75}$ mixed with 40 wt % $M^{Vi}D^{Ph}_{20}M^A$ | 60 | 60 | 40 | 30 | 10 | | | |
| 70 wt % $M^{Vi}_xT^{Ph}_{75}M^A_y$ mixed with 30 wt % $M^{Vi}_mT^{Ph}M^A_n$ | | | 10 | | | | | |
| Dimethylsiloxane polymers and resins | | | | | | 21 | 21 | 21 |
| Trimethylolpropane tris(3-mercaptopropionate) | 9.2 | 4.6 | 9.4 | | | 0.68 | | |
| Pentaerythritol tetrakis(3-mercaptopropionate) | | 4.3 | | | | | | |
| 1,8 dimercapto-3,6-dioxaneoctane | | | | 3.82 | | | | |
| dimethyl methyl(mercaptopropyl) siloxane (3.5 wt % SH) | | | | | 12.7 | | 4.6 | |
| dimethyl methyl(mercaptopropyl) siloxane (7.0 wt % SH) | | | | | | | | 2.3 |

TABLE 1-continued

| Component (grams)/Property | Ex 1 | Ex 2 | Ex 3 | Ex 4 | Comp Ex A | Comp Ex B | Comp Ex C | Comp Ex D |
|---|---|---|---|---|---|---|---|---|
| 2-Hydroxy-2-methylpropiophenone | 0.21 | 0.21 | 0.21 | 0.27 | 0.079 | 0.075 | 0.075 | |
| diisopropoxytitanium bis(ethylacetoacetate) | 0.11 | 0.11 | 0.11 | 0.068 | 0.041 | 0.040 | 0.040 | |
| UV exposure area 2 J/cm$^2$ UV irradiation: Cure yes or no? | Yes | Yes | Yes | Yes | No | No | Yes | Yes |
| Shadow Area Cure 72 hrs. at R.T.: Cure yes or no? | Yes | Yes | Yes | Yes | No | Slight cured | Yes | N/A |
| Shore A Hardness dual cured coating | 66 | 72 | 72 | 56 | N/A | N/A | 25 | 20 |
| Tensile Strength (N/mm$^2$) | 1.40 | 2.29 | 2.21 | 1.17 | N/A | N/A | 0.61 | NM |
| Pencil scratch Hardness | B | H | H | 3B | N/A | N/A | <6B | N/A |

Compound D. In a 250 ml Atlas batch reactor, 84 g of a vinyl ended-methylphenylsiloxane $M^{Vi}_2D^{Ph}_{20}$ and 16 g of a vinyl ended-methylphenylsiloxane $M^{Vi}_3T^{Ph}$ were mixed with the 25 g of HMe$_2$SiOSiMe$_2$C$_2$H$_4$Si(OMe)$_3$. The mixture was agitated for 10 minutes at 350 rpm, and then 0.116 g of Pt catalyst (2.15 wt % Pt catalyst in Toluene) was added into the mixture. The reaction mixture agitated at room temperature under nitrogen for 2 hours, then under 45° C. for another 2 hours. The infrared spectrum of the sample showed a complete loss of SiH peak at 2170 cm$^{-1}$, indicating the completion of the hydrosilylation reaction. Part of the vinyl group on the siloxane converted to moisture curable trialkoxy containing functionality and result in Compound D. {84 wt % $M^{Vi}D^{Ph}_{20}M^A$ mixed with 16 wt % $M_x^{Vi}T^{Ph}M_y^A$ x+y=3; A=—CH$_2$—CH$_2$—SiMe$_2$OSiMe$_2$CH$_2$CH$_2$Si(OMe)$_3$}.

Compound E. 255 g of 55 wt % siloxane resin $M^{Vi}_{25}T^{Ph}_{75}$ (molecular weight of 1690 Da) in toluene was added in a 500 mL round bottle, then 60 g of Compound D was slowly added to the siloxane resin with an agitation speed of 350 rpm. After addition, the toluene was stripped through a rotovap and result in Compound E. {60 wt % $M^{Vi}_{25}T^{Ph}_{75}$ mixed with 33.6 wt % $M^{Vi}D^{Ph}_{20}M_A$ and 6.4 wt % $M_x^{Vi}T^{Ph}M_y^A$ x+y=3; A=—CH$_2$—CH$_2$—SiMe$_2$OSiMe$_2$CH$_2$CH$_2$Si(OMe)$_3$}.

Example 5. In a 20 ml of dental cup, 10 g of compound E and 0.66 g of 1,8 dimercapto-3,6-dioxanoctane were added, the mixture was mixed in a dental mixer at 2000 rpm for 30 s, and then 1.32 g of trimethylolpropane tris(3-mercaptopropionate) was added, the mixture was mixed at 2000 rpm for 60 s. Then 0.05 g of butylated hydroxytoluene and 0.25 g of methyltrimethoxylsilane mixture was added and mixed at 2000 rpm for 30 s. Finally 0.10 g of 2-Hydroxy-2-methylpropiophenone and 0.37 g of diisopropoxytitanium bis(ethylacetoacetate were added to the mixture and was mixed at 2000 rpm for 60 s. Cure and test the material for Shore A hardness and tensile strength as described herein above. The cured material has a tensile strength of 1.12 N/mm$^2$ and hardness of shore A72±2; and pencil hardness of H.

Example 6. In a 20 ml of dental cup, 10 g of compound E and 0.77 g of 1,8 dimercapto-3,6-dioxanoctane were added, the mixture was mixed in a dental mixer at 2000 rpm for 30 s, and then 1.15 g of trimethylolpropane tris(3-mercaptopropionate) was added, the mixture was mixed at 2000 rpm for 60 s. Then 0.05 g of butylated hydroxytoluene and 0.25 g of methyltrimethoxylsilane mixture was added and mixed at 2000 rpm for 30 s. Finally 0.10 g of 2-Hydroxy-2-methylpropiophenone and 0.03 g of diisopropoxytitanium bis(ethylacetoacetate were added to the mixture and was mixed at 2000 rpm for 60 s. Cure and test the material for Shore A hardness and tensile strength as described herein above. The cured material has a tensile strength of 1.93 N/mm$^2$ and hardness of shore A70±2 and pencil hardness of H.

Example 7. In a 20 ml of dental cup, 10 g of compound E and 0.92 g of 1,8 dimercapto-3,6-dioxanoctane were added, the mixture was mixed in a dental mixer at 2000 rpm for 30 s, and then 0.92 g of trimethylolpropane tris(3-mercaptopropionate) was added, the mixture was mixed at 2000 rpm for 60 s. Then 0.05 g of butylated hydroxytoluene and 0.25 g of methyltrimethoxylsilane mixture was added and mixed at 2000 rpm for 30 s. Finally 0.10 g of 2-Hydroxy-2-methylpropiophenone and 0.03 g of diisopropoxytitanium bis(ethylacetoacetate were added to the mixture and was mixed at 2000 rpm for 60 s. Cure the and test the material for Shore A hardness and tensile strength as described herein above. The cured material has a tensile strength of 1.81 N/mm$^2$ and hardness of shore A68±2 and pencil hardness of HB.

Example 8. In a 20 ml of dental cup, 10 g of compound E and 2.27 g of trimethylolpropane tris(3-mercaptopropionate) were added, the mixture was mixed at 2000 rpm for 45 s. Then 0.05 g of butylated hydroxytoluene and 0.25 g of methyltrimethoxylsilane mixture was added and mixed at 2000 rpm for 30 s. Finally 0.10 g of 2-Hydroxy-2-methylpropiophenone and 0.03 g of diisopropoxytitanium bis(ethylacetoacetate) were added to the mixture and was mixed at 2000 rpm for 60 s. Cure the and test the material for Shore A hardness and tensile strength as described herein above. The cured material has a hardness of shore A 73±2, tensile strength of 2.34 N/mm$^2$ and pencil hardness of H.

Example 9. In a 20 ml of dental cup, 10 g of compound E and 1.55 g of 1,8 dimercapto-3,6-dioxanoctane were added, the mixture was mixed in a dental mixer at 2000 rpm for 30 s. Then 0.05 g of butylated hydroxytoluene and 0.25 g of methyltrimethoxylsilane mixture was added and mixed at 2000 rpm for 30 s. Finally 0.210 g of 2-Hydroxy-2-methylpropiophenone and 0.03 g of diisopropoxytitanium bis(ethylacetoacetate were added to the mixture and was mixed at 2000 rpm for 60 s. Cure and test the material for Shore A hardness and tensile strength as described herein above. The cured material has a tensile strength of 1.14 N/mm$^2$ and hardness of shore A50±2 and pencil hardness of 3B.

TABLE 2

| Formulation | Ex 5 | Ex 6 | Ex 7 | Ex 8 | Ex 9 |
|---|---|---|---|---|---|
| 60 wt % $M^{Vi}_{25}T^{Ph}_{75}$ mixed with 33.6 wt % $M^{Vi}D^{Ph}_{20}M^A$ and 6.4 wt % $M_x^{Vi}T^{Ph}M_y^A$ | 10 g | 10 g | 10 g | 10 g | 10 g |
| trimethylolpropane tris(3-mercaptopropionate) | 1.32 g | 1.15 g | 0.92 g | 2.27 g | |
| 1,8 dimercapto-3,6-dioxanoctane ratio | 0.66 g | 0.77 g | 0.92 g | | 1.55 g |
| 2-Hydroxy-2-methylpropiophenone | 0.1 g | 0.1 g | 0.1 g | 0.1 g | 0.1 g |
| diisopropoxytitanium bis(ethylacetoacetate) | 0.03 g | 0.03 g | 0.03 g | 0.03 g | 0.03 g |
| Coating after UV | Cured | Cured | Cured | Cured | Cured |
| Shadow area cure | Cured | Cured | Cured | Cured | cured |
| Tensile Strength (N/mm$^2$) | 2.24 | 1.93 | 1.81 | 2.34 | 1.14 |
| Shore A hardness | 72 ± 2 | 70 ± 2 | 68 ± 2 | 73 ± 2 | 50 ± 2 |
| Pencil hardness | H | H | HB | H | 3B |
| CoKF | 0.237 | 0.341 | 0.368 | N/A | 0.417 |

Example 10. In a 40 ml of dental cup, 20 grams of compound C and 3.74 grams of trimethylolpropane tris(3-mercaptopropionate) were added, the mixture was mixed at 2000 rpm for 60 seconds. The resulting mixture is haze. Then 0.47 grams of methyltrimethoxylsilane was added and mixed at 2000 rpm for 60 seconds. The mixture tuned to slightly haze. Finally 0.16 grams of 2-Hydroxy-2-methylpropiophenone and 0.048 grams of diisopropoxytitanium bis(ethylacetoacetate) were added to the mixture and was mixed at 2000 rpm for 60 seconds. Cure and test the material for Shore A hardness and tensile strength as described herein above. The cured material has a hardness of shore A 76±2, tensile strength of 3.01 N/mm$^2$, and pencil scratch hardness of H.

Example 11. In a 40 ml of dental cup, 20 grams of compound C and 3.74 grams of trimethylolpropane tris(3-mercaptopropionate) were added, the mixture was mixed at 2000 rpm for 60 seconds. The resulting mixture is haze. Then 1.9 grams of methyltrimethoxylsilane was added and mixed at 2000 rpm for 120 seconds. The mixture turns to clear. Finally 0.16 grams of 2-Hydroxy-2-methylpropiophenone and 0.048 grams of diisopropoxytitanium bis(ethylacetoacetate) were added to the mixture and was mixed at 2000 rpm for 60 seconds. Cure and test the material for Shore A hardness and tensile strength as described herein above. The cured material has a hardness of shore A 80±2, tensile strength of 3.92 N/mm$^2$ and pencil scratch hardness of H.

Example 12. In a 40 ml of dental cup, 20 grams of compound C and 3.74 grams of trimethylolpropane tris(3-mercaptopropionate) were added, the mixture was mixed at 2000 rpm for 60 seconds. The resulting mixture is haze. Then 2.61 grams of methyltrimethoxylsilane was added and mixed at 2000 rpm for 120 seconds. The mixture turns to clear. Finally 0.16 grams of 2-Hydroxy-2-methylpropiophenone and 0.048 grams of diisopropoxytitanium bis(ethylacetoacetate) were added to the mixture and was mixed at 2000 rpm for 60 seconds. Cure and test the material for Shore A hardness and tensile strength as described herein above. The cured material has a hardness of shore A 80±2, tensile strength of 3.85 N/mm$^2$ (559 psi), and pencil scratch hardness of H.

TABLE 3

| Formulation | Ex 10 | Ex 11 | Ex 12 |
|---|---|---|---|
| 60 wt % $M^{Vi}_{25}T^{Ph}_{75}$ mixed with 40 wt % $M^{Vi}D^{Ph}_{20}M^A$ | 20 g | 20 g | 20 g |
| trimethylolpropane tris(3-mercaptopropionate) | 3.74 g | 3.74 g | 3.74 g |
| Methytrimethoxysilane | 0.47 g | 1.9 g | 2.61 g |
| 2-Hydroxy-2-methylpropiophenone | 0.1 g | 0.1 g | 0.1 g |
| diisopropoxytitanium bis(ethylacetoacetate) | 0.048 g | 0.048 g | 0.048 g |
| Coating after UV | Cured | Cured | Cured |
| Shadow area cure | Cured | Cured | Cured |
| Viscosity (mPa*s) | 6389 | 2870 | 1832 |
| Tensile Strength (N/mm$^2$) | 3.01 | 3.70 | 3.85 |
| Shore A hardness | 76 ± 2 | 80 ± 2 | 80 ± 2 |
| Pencil hardness | H | H | H |
| CoKF | 0.287 | 0.213 | 0.234 |

What is claimed is:

1. A composition comprising:
   a. a silicon-free mercapto compound comprising 2 or more mercapto groups;
   b. a linear polyorganosiloxane containing one or more linear polyorganosiloxane having one or more than one terminally unsaturated alkenyl group, 40 mole-percent or more phenyl groups relative to moles of silicon atoms and at least one alkoxysilyl group per molecule;
   c. a resinous polyorganosiloxane containing at least one terminally unsaturated alkenyl group and 20 mole-percent or more phenyl groups relative to moles of silicon atoms;
   d. a photoinitiator; and
   e. a moisture cure catalyst; and
   wherein the molar ratio of mercapto groups to terminally unsaturated alkenyl groups in the composition is in a range of 0.3 to 2.0.

2. The composition of claim 1, wherein:
   a. the silicon-free mercapto compound is present at a concentration of 5 to 45 weight-percent based on composition weight;
   b. the linear polyorganosiloxane has the following formula:

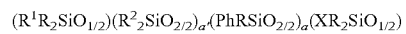

where:
   R is independently in each occurrence selected from a group consisting of $C_{2-8}$ terminally unsaturated alkenyl groups, $C_{1-8}$ alkyl groups, $C_{1-8}$ substituted alkyl groups and phenyl groups;
   $R^1$ is selected from $C_{2-8}$ terminally unsaturated alkenyl groups;

R² is independently in each occurrence selected from a group consisting of $C_{2-8}$ terminally unsaturated alkenyl groups, $C_{1-8}$ saturated alkyl groups and X;

Ph is a phenyl group;

X is an alkoxysilyl group; and subscript a is the average number of $(PhRSiO_{2/2})$ units per molecule and has a value in a range of 2-800;

subscript a' is the average number of $((R^2)_2SiO_{2/2})$ units per molecule and has a value of zero or more and 200 or less;

provided that the average concentration of phenyl groups per molecule is 40 mole-percent or more relative to moles of silicon atoms per molecule; where the concentration of the linear polyorganosiloxane is 10-80 weight-percent of the composition weight;

c. the resinous polyorganosiloxane has the following formula:

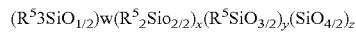

$(R^5{}_3SiO_{1/2})_w(R^5{}_2SiO_{2/2})_x(R^5SiO_{3/2})_y(SiO_{4/2})_z$ where:

R⁵ is independently in each occurrence selected from a group consisting of $C_{2-8}$ terminally unsaturated alkenyl groups, $C_{1-8}$ alkyl groups, phenyl groups, alkoxy groups and alkoxysilyl groups;

subscripts w, x, y and z correspond to the average mole-percent of the corresponding siloxane unit based on moles of siloxane units in the molecule and subscript w is a value in a range of 0-75, x is a value in a range of 0-70, y is a value in a range of 0-100 and z is a value in a range of 0-60; provide that (w+x+y+z) is 100, (y+z) is 20 or more, (x+w) is 10 or more, and the average concentration of phenyl groups per molecule is 20 mole-percent or more relative to mole of silicon atoms and at least one R⁵ of a $(R^5{}_3SiO_{1/2})$ unit is a $C_{2-8}$ terminally unsaturated alkenyl group; where the concentration of the resinous polyorganosiloxane is 30-70 weight-percent of the composition weight;

d. A photoinitiator is present at a concentration of 0.01 to 5.0 weight-percent based on composition weight; and e. A moisture cure catalyst is present at a concentration of 0.1 to 3.0 weight-percent based on composition weight.

3. The composition of any one previous claim 1, wherein the silicon-free mercapto compound contains 3 or more mercapto groups.

4. The composition of claim 1, wherein the composition comprises a combination of silicone-free mercapto compounds including a dimercapto compound and a silicone-free mercapto compound with 3 or more mercapto groups.

5. The composition of claim 1, wherein the silicon-free dimercapto compound has the following structure: HS—$(CH_2CH_2O)_eCH_2CH_2SH$, where subscript e is the average number of ethoxy units per molecule and is a value in a range of one to five.

6. The composition of claim 1, wherein the silicon-free dimercapto compound is present at a concentration of 5 to 45 weight-percent based on composition weight.

7. The composition of claim 1, the composition further comprising 0.5 wt % or more and 20 wt % or less of an alkoxy silane compound based on composition weight.

8. The composition of claim 7, wherein the alkoxy silane is a dialkoxy silane, a trialkoxy silane or a combination thereof.

9. The composition of claim 8, wherein the trialkoxy silane is methyl trimethoxy silane.

* * * * *